United States Patent
Yamaguchi et al.

(10) Patent No.: US 12,181,399 B2
(45) Date of Patent: Dec. 31, 2024

(54) LIGHT-SCATTERING DETECTION DEVICE

(71) Applicant: Shimadzu Corporation, Kyoto (JP)

(72) Inventors: Toru Yamaguchi, Kyoto (JP); Atsushi Kasatani, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 832 days.

(21) Appl. No.: 17/264,586

(22) PCT Filed: Jul. 5, 2019

(86) PCT No.: PCT/JP2019/026854
§ 371 (c)(1),
(2) Date: Oct. 19, 2021

(87) PCT Pub. No.: WO2020/026704
PCT Pub. Date: Feb. 6, 2020

(65) Prior Publication Data
US 2022/0042896 A1 Feb. 10, 2022

(30) Foreign Application Priority Data

Aug. 1, 2018 (JP) .................................. 2018-145106

(51) Int. Cl.
*G01N 15/02* (2024.01)
*G01N 15/0205* (2024.01)
*G01N 15/0227* (2024.01)

(52) U.S. Cl.
CPC ..... *G01N 15/0227* (2013.01); *G01N 15/0211* (2013.01)

(58) Field of Classification Search
CPC ........... G01N 15/0227; G01N 15/0211; G01N 21/53; G01N 2015/0053; G01N 2030/8831; G01N 30/74
See application file for complete search history.

(56) References Cited

U.S. PATENT DOCUMENTS 4,113,386 A * 9/1978 Lepper, Jr. ............. G01N 21/53
356/442
4,616,927 A 10/1986 Phillips et al.
(Continued)

FOREIGN PATENT DOCUMENTS

EP 0182618 A3 5/1986
JP 1995-072068 A 3/1995
(Continued)

OTHER PUBLICATIONS

Berrocal et al. "Multi-scattering software part II: experimental validation for the light intensity distribution"; Optics Express (30), (2022).*
(Continued)

*Primary Examiner* — Mohamed K Amara
(74) *Attorney, Agent, or Firm* — Muir Patent Law, PLLC

(57) ABSTRACT

A light-scattering detection device includes a transparent sample cell, a light source for emitting coherent light onto the sample cell, an imaging optics for collecting scattered light from the sample cell to the periphery thereof at different scattering angles, a slit plate for limiting the scattering angle range, a detector for receiving collected light from the imaging optics, and an aperture plate for limiting, by the aperture width thereof, the width of the light received by the detector, the aperture plate being arranged in the detector with respect to the focal length of the imaging optics. A plurality of detection optics is arranged around the sample cell at equal intervals from the central axis of the sample cell. The aperture width of each aperture plate differs in accordance with the arrangement angle θ of each detector with respect to the sample cell.

10 Claims, 14 Drawing Sheets

(56) References Cited

U.S. PATENT DOCUMENTS

| | | | |
|---|---|---|---|
| 5,379,113 A * | 1/1995 | Niwa | G01N 15/0211 |
| | | | 356/336 |
| 10,215,995 B2 * | 2/2019 | Perrault, Jr. | B01L 3/502715 |
| 10,466,173 B2 * | 11/2019 | Rahmlow | G01N 21/39 |
| 2003/0016356 A1 * | 1/2003 | Adachi | G01N 1/2273 |
| | | | 356/336 |
| 2003/0035105 A1 | 2/2003 | Quist et al. | |
| 2003/0136205 A1 * | 7/2003 | Totoki | B03C 3/53 |
| | | | 73/864.71 |
| 2006/0052944 A1 * | 3/2006 | Nagura | G01N 15/0211 |
| | | | 702/19 |
| 2009/0122315 A1 * | 5/2009 | Jarrell | G01N 30/74 |
| | | | 356/343 |
| 2010/0315637 A1 | 12/2010 | Trainoff | |
| 2011/0090500 A1 * | 4/2011 | Hu | G01N 15/147 |
| | | | 356/337 |
| 2011/0242535 A1 * | 10/2011 | Frose | G01N 21/0303 |
| | | | 356/338 |
| 2013/0100433 A1 | 4/2013 | Frose et al. | |
| 2015/0260647 A1 | 9/2015 | Seto | |
| 2017/0307495 A1 * | 10/2017 | Corbett | G01N 15/0211 |
| 2020/0340898 A1 * | 10/2020 | Ohuchi | B01D 19/00 |
| 2020/0376448 A1 * | 12/2020 | Ohuchi | B01F 23/233 |
| 2020/0388127 A1 * | 12/2020 | Lee | G01N 21/532 |
| 2020/0408683 A1 * | 12/2020 | Yamaguchi | G01N 21/51 |
| 2021/0262914 A1 * | 8/2021 | Norton | G01N 15/1425 |
| 2022/0373477 A1 * | 11/2022 | Ma | G01N 15/00 |

FOREIGN PATENT DOCUMENTS

| | | |
|---|---|---|
| JP | 1998-096695 A | 4/1998 |
| JP | 2003-65941 A | 3/2003 |
| JP | 2008-32548 A | 2/2008 |
| JP | 2010-286491 A | 12/2010 |
| JP | 2015-111163 A | 6/2015 |
| JP | 2015-172556 A | 10/2015 |

OTHER PUBLICATIONS

Multi-scattering software part II: experimental validation for the light intensity distribution, Frantz et al. (Opt. Express, (30) 2022.*
Odaka, "Analysis of absolute molecular weight and complex formation of proteins by light scattering method" Biotechnology vol. 89, pp. 398-400, 2011.
First Office Action dated Nov. 17, 2023 issued for the corresponding Chinese Patent Application No. 201980050277.6.

* cited by examiner

LIGHT-SCATTERING DETECTION DEVICE

TECHNICAL FIELD

The present invention relates to a light-scattering detection device used in a fine particle detection device for measuring a molecular weight, a rotation radius (size), etc. of a fine particle dispersed in a liquid sample.

BACKGROUND ART

As a method for separating fine particles, such as, e.g., proteins, dispersed in a liquid sample, size-exclusion chromatography (SEC) and gel-filtration chromatography (GPC) are known. In recent years, as a chromatographic detection device, in addition to an ultraviolet ray (UV) absorbance detection device and a differential refractive index detection device, a multi-angle light scattering (MALS) detection device have been used. A MALS detecting device is characterized in that a molecular weight and a particle diameter of a measurement sample can be calculated (see Patent Documents 1 and 2).

FIG. 12 shows a plan view of a basic configuration example of a MALS detecting device and FIG. 13 shows a side view thereof. In FIG. 12 and FIG. 13, the reference numeral 110 denotes a sample cell, 111 denotes a liquid sample, 120 denotes a light source, 170 denotes a detector, and 180 denotes a beam damper. As shown in FIG. 12 and FIG. 13, a liquid sample 111 is fed to the inside of the cylindrical sample cell 110, and a light source 120 emits light to pass through the sample cell 110 and the flow path center. As the light source 120, visible laser light is usually used. The angle $\theta$ to the traveling direction of the light is defined as a scattering angle on the horizontal plane (on the XY plane). A plurality of detectors 170 is arranged on the horizontal plane (on the XY plane) passing the sample cell 110 and the flow path center so as to detect the light at different scattering angles.

The cylindrical sample cell has a characteristic that the arrangement angle of the detectors and scattering angles coincide. FIG. 14A to FIG. 14C are explanatory diagrams showing the relation between the scattered light intensity and the scattering angle. FIG. 14A shows the relation in a case where the particle diameter is 10 nm, FIG. 14B shows the relation in a case where the particle diameter is 100 nm, and FIG. 14C shows the relation in a case where the particle diameter is 1,000 nm. The results are calculated from a Mie-scattering theory, assuming that the wavelength of the incident light is 660 nm, the refractive index of the particle is 1.6, and the refractive index of the solvent is 1.33. As shown in FIG. 14A to FIG. 14C, the relation between the scattered light intensity and the scattering angle depends on the particle diameter of the sample. When the sample is sufficiently smaller than the wave length of the incident light, the scattered light is generated isotropically, and there is no scattering angle dependency of the scattered light intensity. The greater the particle diameter of the sample, the stronger the forward scattering of the scattered light. The particle diameter and the molecular weight can be calculated by extrapolating the scattered light intensity of the plurality of arranged detectors to the scattering angle 0 degree (see Non-Patent Document 1).

It is desirable that the MALS detecting device can measure a lower concentration of a sample and have a higher S/N ratio. For this purpose, an optical system that efficiently receives scattered light generated from the sample to detectors is required. This means that the solid angle of the scattered light incident on the detector must be large. When increasing the solid angle of the detector, when the solid angle in the horizontal direction (on the surface of the optical axis) is increased, the angular resolution of each detector deteriorates. Therefore, it is desirable to set a larger solid angle in the vertical direction. Increasing the size of the detector in order to increase the solid angle is not preferable because the dark current increases. To set a larger solid angle without increasing the detector size, a method of condensing light with a lens or the like is adopted. That is, a configuration in which scattered light generated in a flow path of a sample cell is imaged on a detector via an imaging lens is adopted.

As a basic configuration of another MALS detecting device, a method disclosed in Patent Documents 1 and 2 can be exemplified. In this method, the flow path is formed so as to penetrate the side surface of the cylindrical sample cell, and the light is incident parallel to the flow path. The side surface of the cylindrical sample cell acts as a lens, so that the solid angle in the horizontal direction can be set larger without deteriorating the angular resolution. However, since light is incident parallel to the flow path, it is susceptible to the turbulence of the flow field in the flow path, and therefore it has been pointed out that the accuracy is deteriorated at low scattering angles.

PRIOR ART DOCUMENT

Patent Document

Patent Document 1: Japanese Unexamined Patent Application Publication No. H07-72068
Patent Document 2: Japanese Unexamined Patent Application Publication No. 2015-111163
Non-Patent Document 1: "Analysis of Absolute molecular weight and Complex Formation of Proteins by Light-Scattering Method", Masafumi Odaka, Vol. 89 of Bioengineering

SUMMARY OF THE INVENTION

Problems to be Solved by the Invention

The size of the scattered light formed on the light receiving surface of the detector image differs depending on the arrangement angle of the detector. When the sample is uniformly distributed in the sample cell, the scattered light derived from the sample occurs at a length corresponding to the inner diameter L of the sample cell. The length of the scattered image formed on the detector is defined by $ML\sin\theta$, where the arrangement angle of the detector is $\theta$ and the multiplication factor of the imaging optics composed of a cell and an imaging lens is M. In a case where the detectors have the same size, the generation area of the scattered light received by the detector differs depending on the arrangement angle of the detector. Since scattered light is generated at the interface between air and glass and the interface between glass and liquid in a sample cell, it is not desirable to use a large detector that compensates for the entire sample area.

In a case where the scattered light generation area in which each detector receives light differs, the higher the detector receives light in a wider area, the higher the scattered light output will be. In a case where a sample is uniformly distributed in a sample cell, the detector output can be corrected in the scattered light generation area in which the light is received. However, in a case where a sample is nonuniformly distributed within a sample cell, this correction becomes inaccurate. That is, since the angle profile of the scattered light output becomes inaccurate, the particle diameter and the molecular weight to be calculated become inaccurate.

In a common chromatogram, the peak for the same sample is a temporally wide peak shape. In a case of a cylindrical sample cell with a flow path therein, the concentration at the center of the flow path is higher at the rising edge of the peak, and the concentration decreases with the distance from the center. At the falling edge of the peak, the substitution with a mobile phase solvent quickly progresses as it approaches the center of the flow path, resulting in a profile with a lower concentration of the center. Therefore, when the scattered light generation area of received light differs depending on the arrangement angle of the detector, the peak shape of the sample in the chromatogram differs, which deteriorates the molecular weight precision and the particle diameter precision.

Under the circumstance, it is an object of the present invention to provide a light-scattering detection device capable of well maintaining molecular weight precision and particle diameter calculation precision without dependence of a peak shape during the passing of a liquid through a sample cell on an arrangement angle of a detector.

Means for Solving the Problem

A light-scattering detection device according to one aspect of the present invention is a light-scattering detection device for detecting fine particles in a liquid sample. The light-scattering detection device includes:
a transparent sample cell configured to hold the liquid sample;
a light source configured to emit coherent light to the sample cell;
an imaging optics configured to collect scattered light from the sample cell to a periphery thereof at different scattering angles;
a slit plate configured to limit a scattering angle range, the slit plate being arranged on an incident side of the imaging optics;
a detector configured to receive collected light from the imaging optics; and
an aperture plate configured to limit a width of light received by the detector by an aperture width thereof, the aperture plate being arranged in a detector side with respect to a focal length of the imaging optics,
wherein a plurality of detection optics extending from the sample cell to the detector is arranged around the sample cell at equal intervals from a central axis of the sample cell,
wherein the plurality of detectors includes a first detector arranged at a position closer to a reference position and a second detector arranged at a position further away from the reference position, the reference position being defined as a position at which an angle with respect to an incident direction of the coherent light to the sample cell is 90°, and
wherein the aperture width of the aperture for the first detector is larger than the aperture width of the aperture for the second detector.

In the configuration of the above-described light-scattering detection device, the aperture width of each aperture plate is preferably a value obtained by multiplying a distance from the central axis of the sample cell to the detector by a sine value of an arrangement angle of each detector.

Further, the aperture of the aperture plate is preferably straight in at least a side extending along a vertical direction.

Further, the aperture plate is preferably arranged rotatably in a horizontal direction to perform a fine adjustment of the aperture width.

Further, the aperture plate preferably includes a controller for controlling a rotation angle of the aperture plate based on refractive index information of a solvent in the liquid sample.

The aperture plate preferably includes a rotating device for rotating the aperture plate and a storage unit for storing the refractive index information of the solvent in the liquid sample.

It is preferable that each slit plate is formed to have a slit for limiting the scattering angle range and a width of each slit becomes maximum at an arrangement angle of 90° with respect to the incident direction of the coherent light to the sample cell and decreases as the arrangement angle deviates from the arrangement angle of 90°.

Further, the width of each slit is preferably a value obtained by multiplying the width of the slit when the arrangement angle is 90° by a sine value of the arrangement angle of each detector 70.

In addition, the light source is preferably arranged such that an optical axis of the coherent light incident on the sample cell from the light source is inclined at a predetermined angle from a plane including the sample cell and the detector.

Effects of the Invention

According to the present invention, it is possible to provide a light-scattering detection device capable of well maintaining molecular weight precision and particle diameter calculation precision without dependence of a peak shape during the passing of a liquid through a sample cell on an arrangement angle of a detector.

EMBODIMENTS FOR CARRYING OUT THE INVENTION

Figure 1:
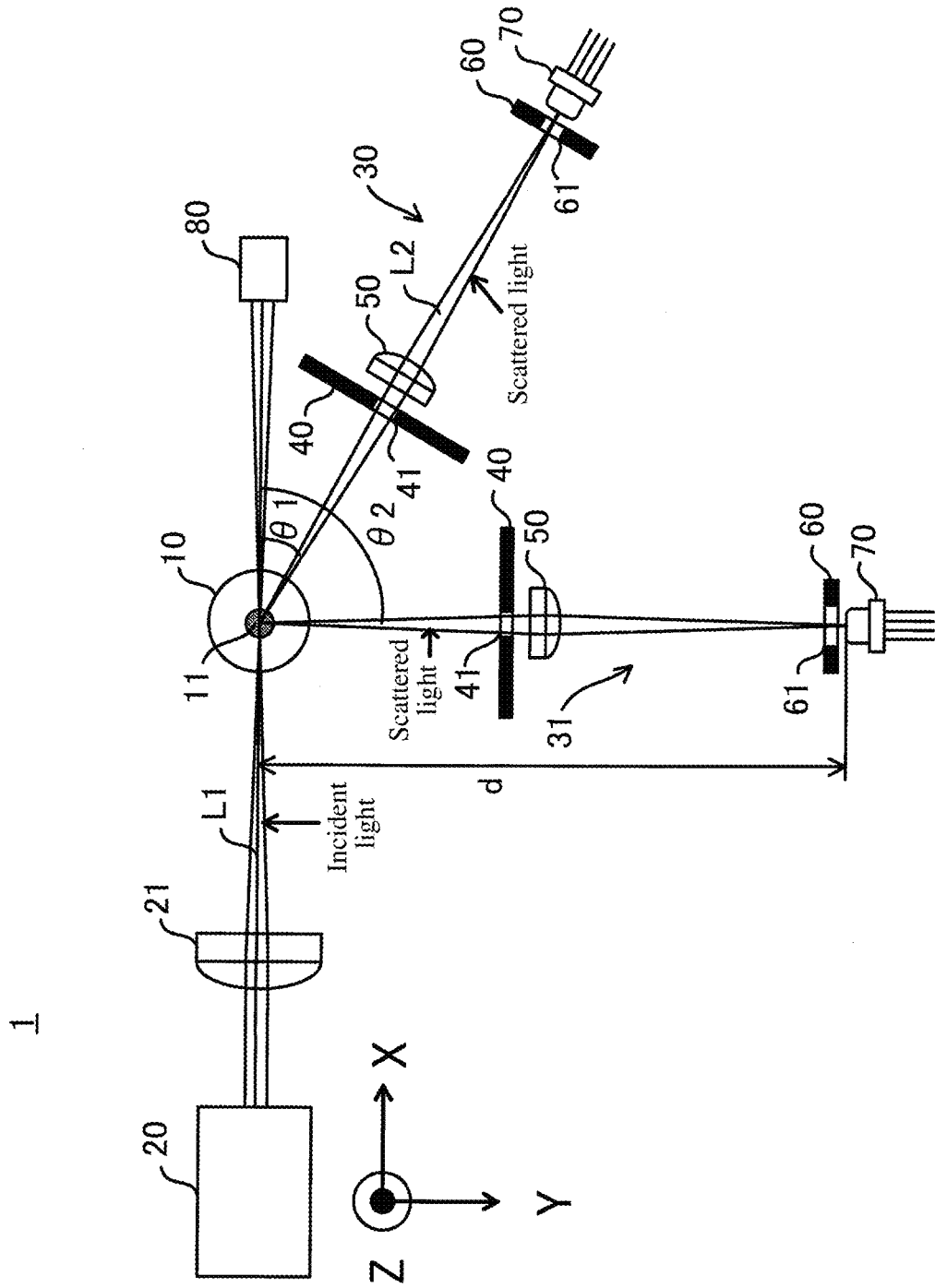
FIG. 1 is a plan view of a first embodiment of a light-scattering detection device according to the present invention.

The first and second embodiments of light-scattering detection devices according to the present invention will be explained below with reference to the drawings. In the drawings, the same reference numerals denote the same or similar components.

First Embodiment

[Configuration of Light-Scattering Detection Device]

Figure 2:
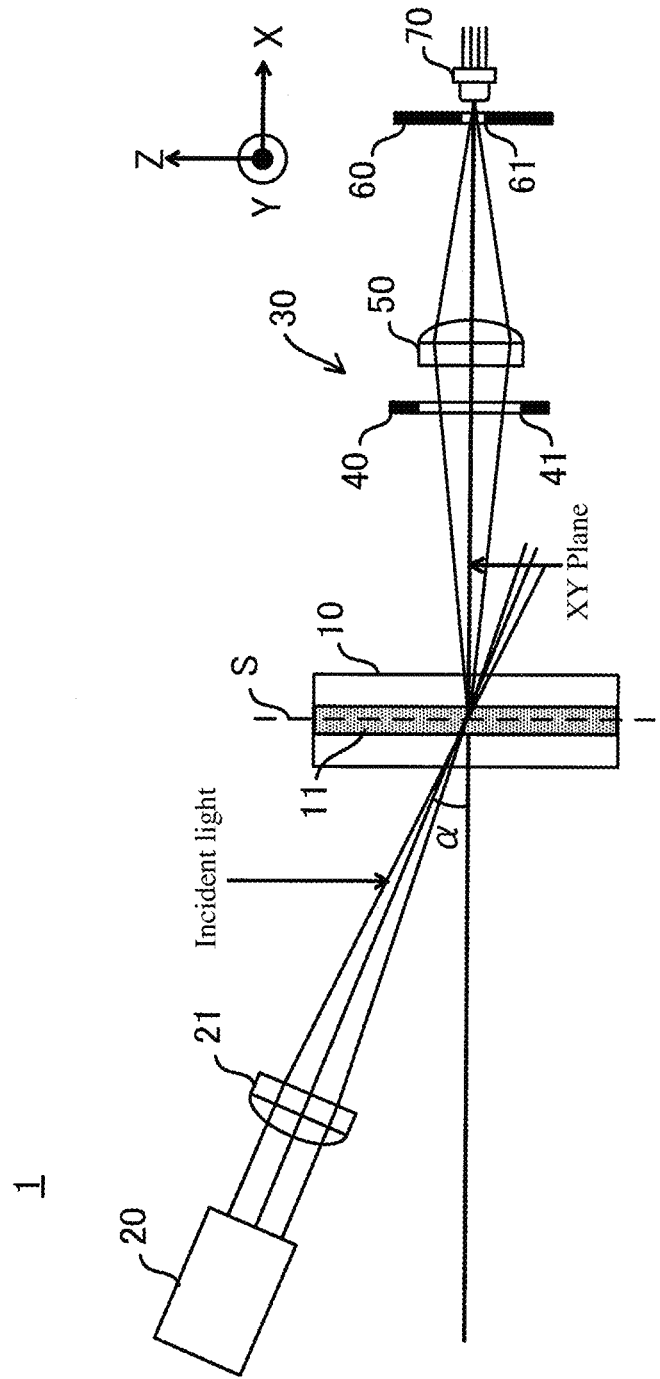
FIG. 2 is a side view of the light-scattering detection device according to the first embodiment.

First, referring to FIG. 1 to FIG. 3, the configuration of a first embodiment of the light-scattering detection device according to the present invention will be described. FIG. 1 is a side view of the first embodiment of the light-scattering detection device according to the present invention. FIG. 2 is a side view of the light-scattering detection device according to the first embodiment. As shown in FIG. 1 and FIG. 2, the light-scattering detection device 1 according to this embodiment is a device for detecting a molecular weight and a rotational radius (size) of fine particles, such as, e.g., proteins, dispersed in a liquid sample. The light-scattering detection device 1 is provided with a sample cell 10, a light source 20, a beam damper 80, a slit plate 40, an imaging optics 50, an aperture plate 60, and a detector 70. Each of the constituent elements will be described below.

The sample cell 10 is a transparent cylindrical cell configured to hold a liquid sample in its inner flow path. The sample cell 10 is made of, for example, colorless transparent quartz glass.

The light source 20 emits coherent light to the sample cell 10. The "coherent light" refers to the light in which the phase relation of the light waves at any two points in the light flux is kept constant in time and shows perfect coherency even if a large optical path difference is given and superimposed again after dividing the light flux in any way. As the light source 20, for example, a laser light source for emitting visible light laser can be adopted. There is no perfect coherent light in nature, and laser light oscillating in a single-mode is light that is close to a coherent state.

On the optical path L1 of the incident light from the light source 20 to the sample cell 10, a light collection optical system 21 is arranged. As the light collection optical system 21, for example, a single condenser lens is adopted. This condenser lens is a plano-convex lens in which the incident side of light from the light source 20 is formed in a convex surface and the outgoing side is formed in a plane. In this embodiment, as the light collection optical system 21, although a single condenser lens is adopted, the light collection optical system 21 may be configured by combining a plurality of compound lenses and condensing mirrors.

The light source 20 and the light collection optical system 21 are arranged such that the optical axis of the coherent light incident on the sample cell 10 from the light source 20 is inclined at a predetermined angle (tilt angle α) from the plane (XY plane) including the sample cell 10 and the detector 70. Specifically, the light source 20 and the light collection optical system 21 are arranged so that the incident light is incident on the sample cell 10 obliquely upward with respect to the sample cell 10. By tilting (angle α) the incident light with respect to the sample cell 10, it is possible to reduce the stray light due to the reflected light at the interface between the glass of the sample cell and air and the interface between the glass and the flow path (hereinafter collectively referred to as the "cell interface"). The laser light emitted from the light source 20 passes through the light collection optical system 21 and then focused in the vicinity of the central axis of the sample cell 10.

The beam damper 80 is a device that shields the laser light transmitted through the sample cell 10. The beam damper 80 is arranged at the position where the laser light incident on the sample cell 10 and passed through the sample cell 10 travels straight. The beam damper 80 is also referred to as a beam-trap and is configured to minimize reflections of the laser light out of the damper by reflecting the laser light infinitely in the damper.

A detection optical system 30 is arranged on the optical path L2 of the outgoing light from the sample cell 10. The detection optical system 30 of this embodiment is composed of a slit plate 40, an imaging optics 50, an aperture plate 60, and a detector 70.

The imaging optics 50 collects light scattered from the sample cell 10 to the surroundings at different scattering angles. As the imaging optics 50, for example, a single imaging lens is adopted. This imaging lens is a plano-convex lens in which the incident side of the scattered light from the sample cell 10 is formed in a plane and the outgoing side is formed on the convex surface. In this embodiment, as the imaging optics 50, although a single imaging lens is adopted, the imaging optics 50 may be configured by combining a plurality of compound lenses and an imaging mirror.

The slit plate 40 is arranged between the sample cell 10 and the imaging optics 50 on the optical path L2 of the outgoing light from the sample cell 10. The slit plate 40 limits the scattering angle range incident on the imaging optics 50. That is, the slit 41 formed in the slit plate 40 is elongated in the vertical direction and has at least a side along the vertical direction which is straight in order to limit the scattering angle in the horizontal direction and take much light flux in the vertical direction. Specifically, the slit 41 has a rectangular shape and a rectangular hole shape elongated in the vertical direction.

The aperture plate 60 is arranged on the imaging optics side of the detector 70 on the optical path L2 of the outgoing light from the sample cell 10. The aperture plate 60 has a function of limiting stray light, and the aperture 61 is open in front of the light receiving surface of the detector 70. The aperture of the aperture plate 60 is straight at least in the side along in the vertical direction. Specifically, the aperture 61 of the aperture plate 60 has a rectangular shape and a rectangular hole shape elongated in the vertical direction.

Figure 3:
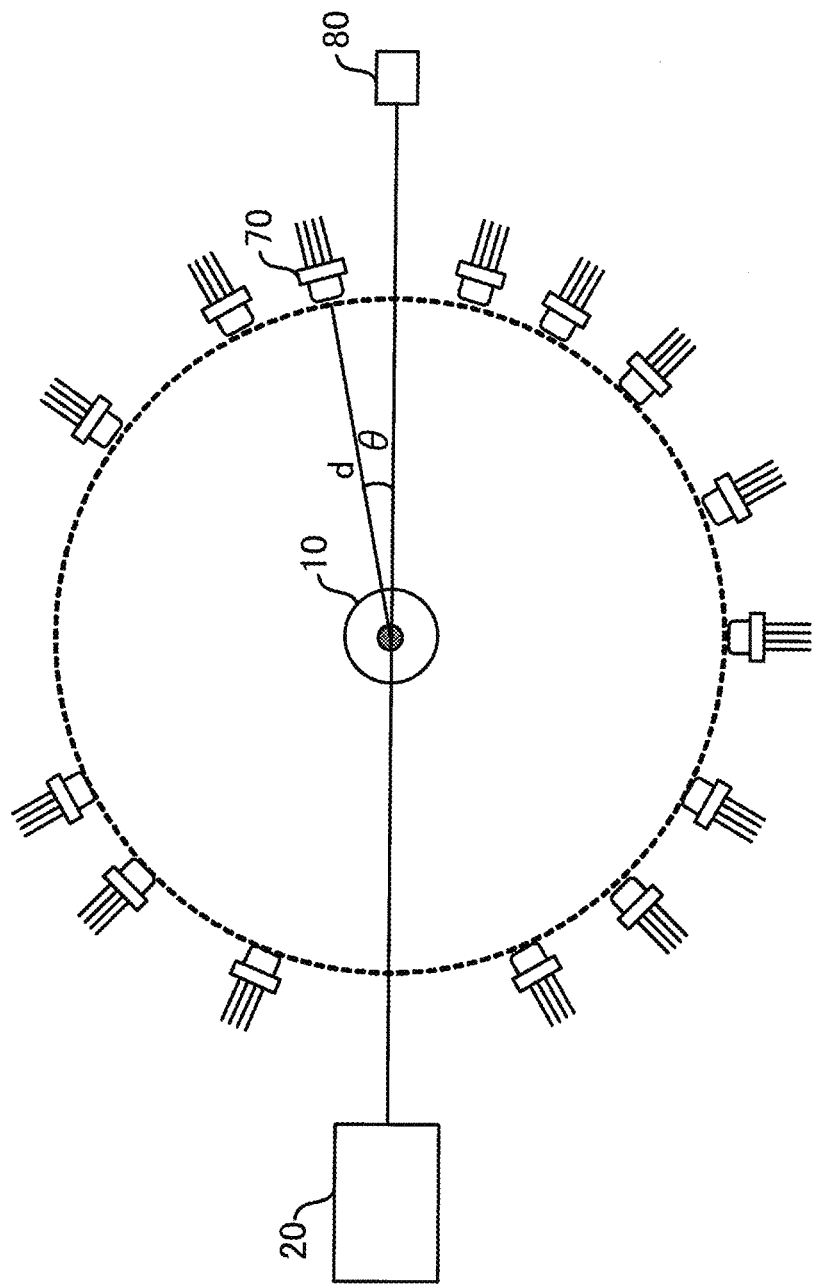
FIG. 3 is a plan view of the light-scattering detection device (MALS) according to the first embodiment.

As shown in FIG. 1 and FIG. 3, a plurality of detection optical systems 30 extending from the sample cell 10 to the detector 70 is arranged around the sample cell 10 at equal intervals d from the central axis S. The angle θ from the traveling direction of the light is defined as a scattering angle on the horizontal plane (on the XY plane). A plurality of detectors 70 is arranged on a horizontal plane (on the XY plane) passing the central axis S of the sample cell 10 so that light can be detected at different scattering angles. In the example of FIG. 1, the detection optical systems 30 and 31 are arranged at arrangement angles of θ1 and θ2. Further, in the example of FIG. 1, when the position of the sample cell 10 where the angle with respect to the incident direction of the coherent light is 90 degrees is defined as a reference position, the detector 70 of the detection optical system 30 is arranged at a position further away from the reference position, i.e., the detector 70 of the detection optical system 30 is a second detector positioned at the arrangement angle θ1. The detector 70 of the arrangement angle 31 is a first detector arranged at a position closer to the reference position, i.e., the detector 70 of the arrangement angle 31 is a first detector positioned at the arrangement angle θ2 larger than the arrangement angle θ1. In the embodiment of FIG. 3, 14 detectors 70 are arranged at equal intervals d around the sample cell 10. Note that in FIG. 3, the light collection optical system, the slit plates, the image-forming optical systems, and the aperture plates are not illustrated.

Since a plurality of detectors 70 is arranged around the sample cell 10 in this manner, the aperture width of each aperture plate 60 is differentiated depending on the arrangement angle of each detector 70 with respect to the sample cell 10. That is, the aperture width of the aperture plate 60 becomes maximum where the arrangement angle to the incident direction of the coherent light to the sample cell 10 is 90°, and the aperture width decreases as the arrangement angle deviates from the arrangement angle 90°. In this embodiment, the aperture width of each aperture plate 60 is set to a value obtained by multiplying the distance from the central axis of the sample cell 10 to the detector 70 by the sine value of the arrangement angle of each detector 70. This value may be a value in which slight correction is added as long as the purpose of the present invention can be achieved, which is also included within the scope of the present invention.

As described above, when the inner diameter of the sample cell 10 is L, the arrangement angle of the detector 70 is θ, the magnification of the image-forming optical system composed of the cell and the coupling lenses is M, the length of the scattered light image to be imaged on the detector 70 is defined as MLsinθ. Note that the inner diameter L of the sample call 10 and the magnification M of the image-forming optical system are the same for all detection optical systems 30, 31. Therefore, in a case where a plurality of detection optical systems 30, 31 is arranged around the sample cell 10 at equal intervals d, the aperture width of the aperture plate 60 in front of each detector are differentiated depending on the arrangement angle θ1, θ2 . . . of each detector 70. The aperture width of the aperture plate 60 is set by multiplying the distance d from the central axis S of the sample cell 10 to the detector 70 by the sine value of the arrangement angle θ1, θ2 of each detector 70. Specifically, the aperture width of the aperture plate 60 at the arrangement angle θ1 is set by the width of dsinθ1. Further, the aperture width of the aperture plate 60 at the arrangement angle θ2 is set by the width of dsinθ2.

The detector 70 receives the collected light from the imaging optics 50. That is, the light receiving surface of the detector 70 is positioned at the focal point of the imaging optics 50. As the detector 70 of this embodiment, for example, although it adopts a photodiode (PD), an array detector, such as a two-dimensional CMOS, may be adopted.

[Operation of Light-Scattering Detection Device]

Next, referring to FIG. 1 to FIG. 8, the operation of the light-scattering detection device according to this embodiment will be described.

As shown in FIG. 1, a liquid sample 11 is fed through the flow path of the cylindrical sample cell 10. Upon completion of the feeding of the liquid sample 11, visible laser light which is coherent light is emitted from the light source 20 through the light collection optical system 21. The visible laser light travels along the optical path L1 so that the laser light is incident on the liquid sample 11 in the flow path of the sample cell 10. When the laser light is incident on the liquid sample, the light hits the fine particles included in the liquid sample 11 to be scattered at a predetermined scattering angle. Then, the scattered light emitted from the sample cell 10 passes through the slit 41 of the slit plate 40 and then incident on the light receiving surface of detector 70 via the imaging optics 50 and the aperture plate 60. On the other hand, the laser light incident on the sample cell 10 and transmitted straight ahead is absorbed by the beam damper 80.

When the scattered light exits the sample cell 10, reflected light RL occur as stray light at the interface between air and glass of the sample cell 10 and the interface between glass and liquid of the sample cell 10. The slit plate 40 limits the scattering angle range of the scattered light incident on the imaging optics 50 by the slit 41 elongated in the vertical direction. The imaging optics 50 collects the scattered light and images it onto the light receiving surface of the detector 70. In front of the detector 70, the light receiving width to the detector 70 is further limited by the aperture width of the aperture 61 of the aperture plate 60.

As shown in FIG. 1 and FIG. 3, a plurality of detection optics 30 extending from the sample cell 10 to the detector 70 is arranged at equal intervals d around the sample cell 10. The image of the scattered light formed on the light receiving surface of the detector 70 differs in the size depending on the arrangement angle of the detector 70. As described above, in a case where the liquid sample 11 is uniformly distributed in the sample cell 10, when the inner diameter of the sample cell 10 is L, the arrangement angle of the detector is θ, and the magnification of the imaging optics composed of the cell and the imaging lens is M, the length of the scattered light image to be imaged on the detector is represented by MLsinθ.

Here, the inner diameter L of the sample cell 10 and the magnification M of the image-forming optical system are the same in all detection optical systems 30, 31. Therefore, the aperture width of the aperture plate 60 in front of each detector is differentiated in accordance with the arrangement angle θ1, θ2 of each detector 70 with respect to the sample cell 10. That is, the aperture width of the aperture plate 60 is set by multiplying the distance d from the central axis S of the sample cell 10 to the detector 70 by the sine value of the arrangement angle θ1, θ2 of each the respective detector 70. By differentiating the aperture width of the aperture plate 60 in accordance with the arrangement angle θ1, θ2 of each detector 70, it is possible to set the light receiving width to the detector 70 to the optimum width.

[Observation of Scattered Light Image on Light Receiving Surface of Detector]

Figure 4:
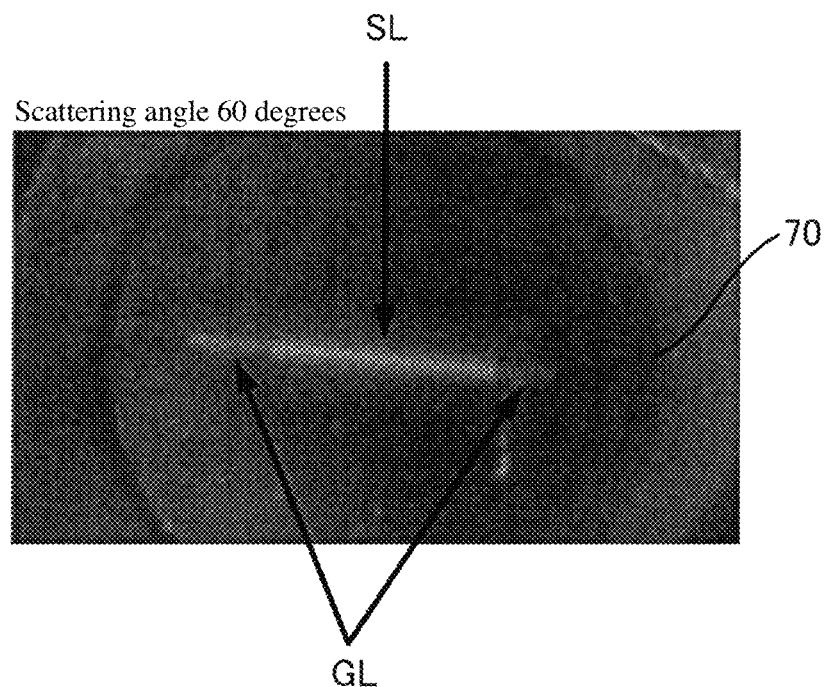
FIG. 4 is an observational photograph of a scattered light image on a light receiving surface of a detector arranged at an arrangement angle of 60 degrees.
Figure 5:
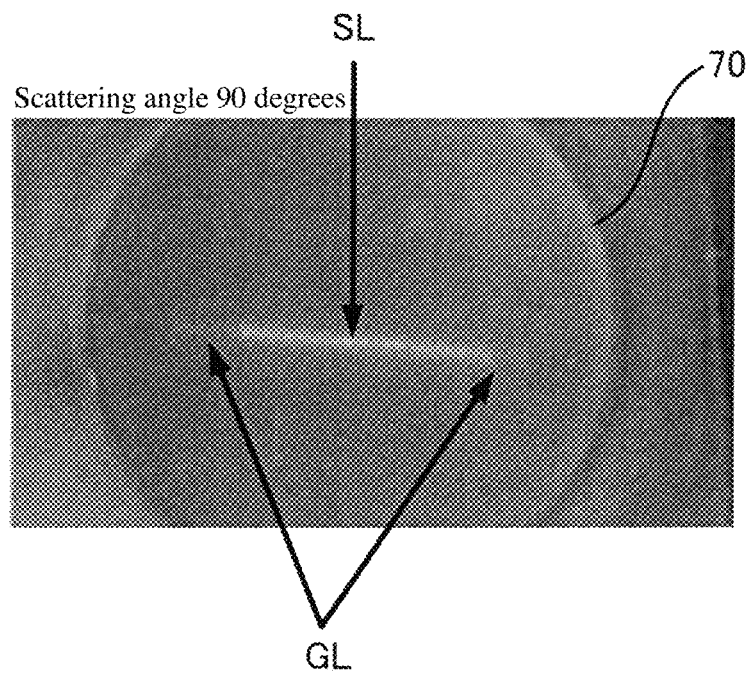
FIG. 5 is an observational photograph of a scattered light image on a light receiving surface of a detector arranged at an arrangement angle of 90 degrees.

To confirm the functions and effects of the first embodiment, the scattered light image imaged on the detector was observed by imaging. FIG. 4 is an observation photograph of the scattered light image on the light receiving surface of the detector arranged at the arrangement angle of 60 degrees. FIG. 5 is an observation photograph of the scattered light image on the light receiving surface of the detector arranged at the arrangement angle of 90 degrees. In FIG. 4 and FIG. 5, SL denotes the scattered light derived from the solvent, and GL denotes the scattered light derived from the glass.

The imaging conditions were set as follows. The sample cell 10 was, for example, a transparent cylindrical cell having an inner diameter of 1.6 mm and an outer diameter of 8.0 mm. An imaging lens (plano-convex lens) was placed at the position of 50 mm from the central axis S of the sample cell 10. The imaging lens, for example, was φ12.7 mm in the convex diameter and 38 mm in the focal length. The aperture plate 60 and the detector 70 (PD) were arranged at the position away from the central axis S of the sample cell 10 by 100 mm.

As shown in FIG. 4 and FIG. 5, the scattered light image of the water on the light receiving surface of the detector (PD) at the arrangement angles of 90 degrees and 60 degrees with the water enclosed as a solvent was imaged and observed. The length of the scattered light image had the relation of $ML\sin\theta$ as described above, the aperture width of the aperture plate 60 in front of the detector arranged the arrangement angle of 60 degrees was shortened by the sine amount of the arrangement angle θ.

[Chromatographic Measurement]

Figure 6A:
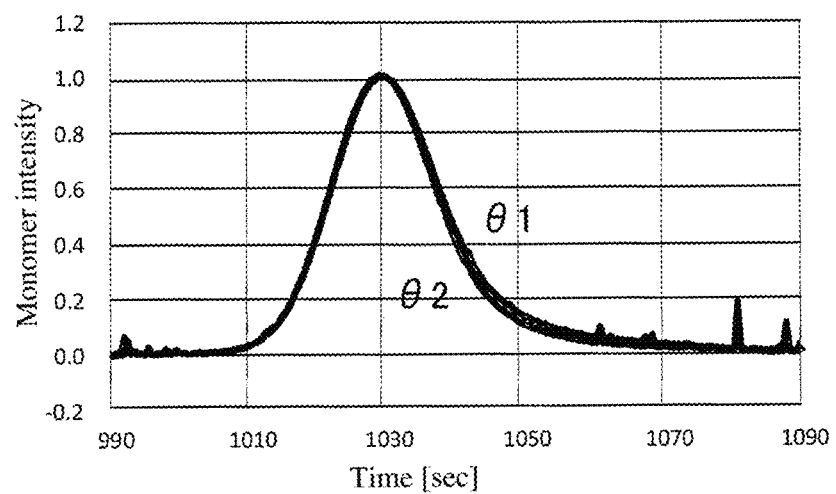
FIG. 6A is an explanatory diagram of a chromatographic measurement when an aperture width of an aperture plate is constant regardless of the arrangement angle.
Figure 6B:
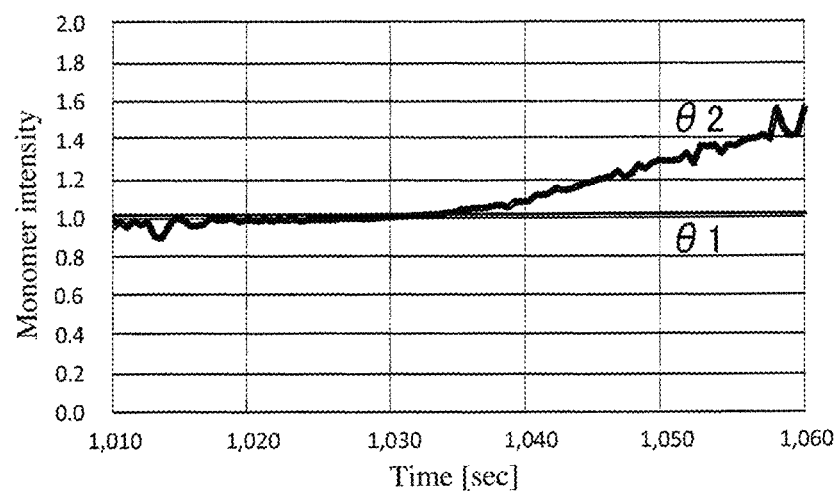
FIG. 6B is an explanatory diagram of a chromatographic measurement when an aperture width of an aperture plate is constant regardless of the arrangement angle.

FIG. 6A and FIG. 6B are explanatory diagrams of the chromatographic measurement when the aperture width of the aperture plate is constant regardless of the arrangement angle. That is, the output of the detector (PD) at the arrangement angles θ1 and θ2, corresponding to BSA (bovine serum albumin) monomers in the size-exclusion chromatographic measurement, is shown. FIG. 6A is a result normalized with the maximum value of the monomer peak (1,030 sec). FIG. 6B is the result of dividing the output of θ2 by the output of θ1. Since it is a sample of the same properties separated by the column, the peak shapes of θ1 and θ2 in FIG. 6A are equal, the value of θ2 in FIG. 6B is ideally the inclination of 0, but the result is rising to the right as time passes. From this result, when the molecular weight and the particle diameter are calculated, the calculation result is different within the peak, and the calculation accuracy is deteriorated.

Figure 7A:
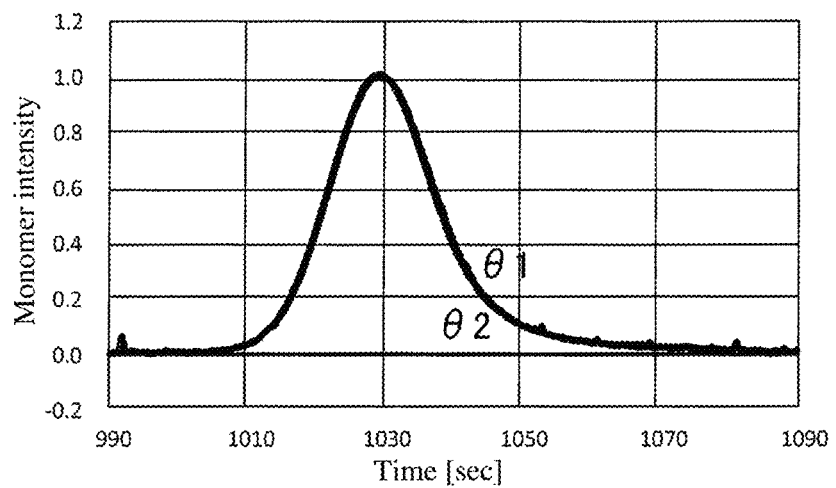
FIG. 7A is an explanatory diagram of a chromatographic measurement when an aperture width of an aperture plate is changed by the arrangement angle.
Figure 7B:
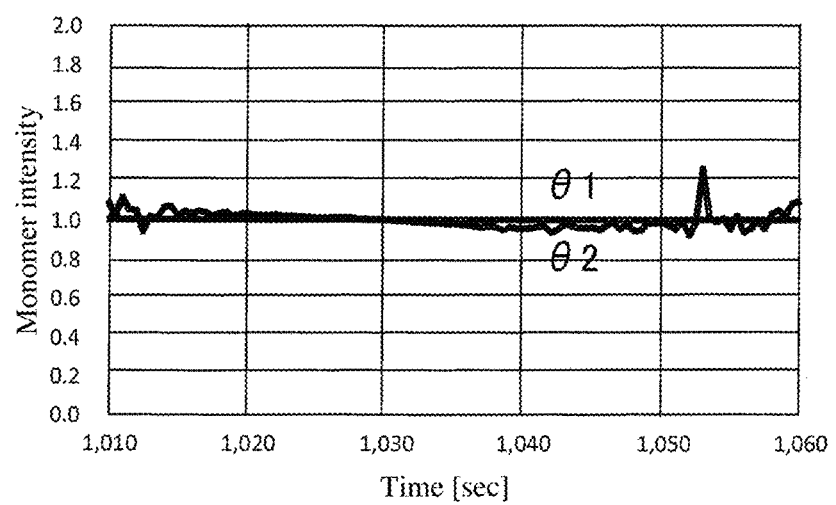
FIG. 7B is an explanatory diagram of a chromatographic measurement when an aperture width of an aperture plate is changed by the arrangement angle.

On the other hand, FIG. 7A and FIG. 7B are explanatory diagrams of the chromatographic measurement when the aperture width of the aperture plate is differentiated by the arrangement angle. That is, it is the result in which the aperture width of the aperture plate is adjusted so that the detector (PD) receives the scattered light from the same sample area from the same sample area. Compared with FIG. 6A and FIG. 6B, the variation of θ2 is small, and the variation of the calculated values of the molecular weight and the particle diameter within the peak is small.

As described above, in the light-scattering detection device 1 of the first embodiment, since the aperture width of the aperture plate 60 in front of each detector is differentiated in accordance with the arrangement angle θ1, θ2 of each detector 70, it is possible to set the light receiving width to the detector 70 to the optimum width. Therefore, according to the light-scattering detection device 1 of the first embodiment, the peak shape of the sample cell 10 at the time of passing the liquid does not depend on the arrangement angle of detector 70, and the molecular weight precision and the particle diameter calculation precision can be properly maintained.

Second Embodiment

Figure 8:
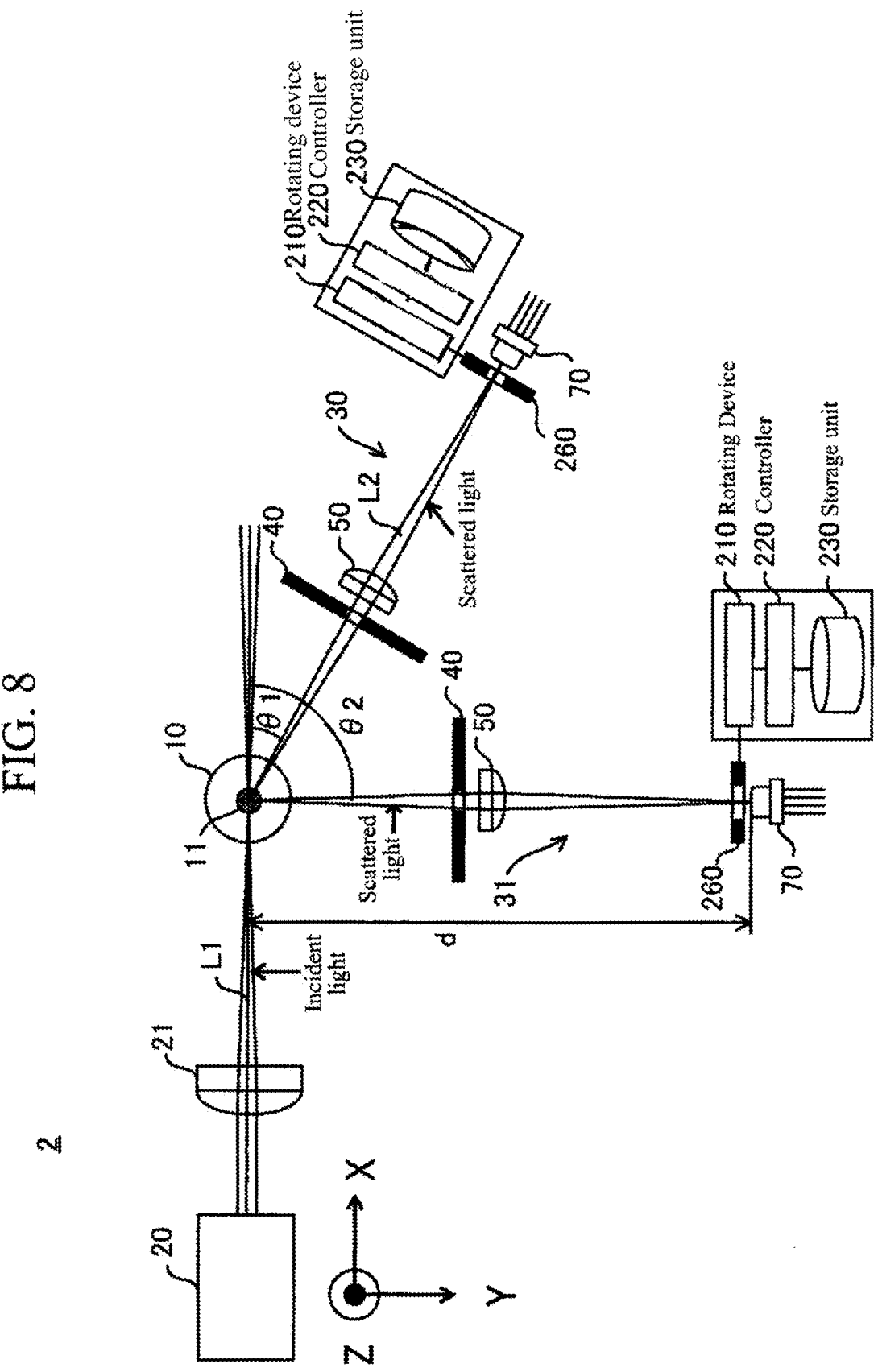
FIG. 8 is a plan view of a light-scattering detection device according to a second embodiment.

Next, referring to FIG. 8, a light-scattering detection device 2 according to a second embodiment will be described. FIG. 8 is a plan view of the light-scattering detection device according to the second embodiment. Note that the same reference numerals as those of the first embodiment have the same or similar configurations.

As shown in FIG. 8, the light-scattering detection device 2 according to the second embodiment differs from the first embodiment in that the aperture plate 260 is arranged rotatably in the horizontal direction in order to perform fine adjustments of the aperture width. That is, the aperture plate 260 is, for example, supported by a rotation shaft (not shown) at the center in the vertical direction, and is configured to be rotatable in the horizontal direction. The aperture plate 260 is provided with a rotating device 210 for rotating the aperture plate 260, a storage unit 230 for storing refractive index information of a solvent in a liquid sample, and a controller 220 for controlling the rotation angle of the aperture plate 260 based on the refractive index information of the solvent.

The pivot shaft is, for example, connected to the rotating device 210, such as, e.g., a stepping motor, and rotates the aperture plate 260 by driving the rotary shaft. The storage unit 230 stores refractive index information of solvents in various liquid samples. The controller 220 extracts the refractive index information of the solvent of the liquid sample 11 to be analyzed from the storage unit 230. The controller 220 drives the rotating device 210 and controls the rotation angle of the aperture plate 260 based on the refractive index information of the solvent. By controlling the rotation angle of the aperture plate 260, the aperture plate 260 is tilted in the horizontal direction to substantially perform the fine-adjustment of the aperture width.

The light-scattering detection device 2 according to the second embodiment has basically the same effects as those of the light-scattering detection device 1 according to the first embodiment. In particular, in the light-scattering detection device 2 according to the second embodiment, the aperture plate 260 is arranged rotatably in the horizontal direction in order to perform the fine adjustment of the aperture width. The aperture plate 260 is provided with the rotating device 210 for rotating the aperture plate 260, the storage unit 230 for storing refractive index information of a solvent in the liquid sample, and the controller 220 for controlling the rotation angle of the aperture plate based on the refractive index information of the solvent. Therefore, according to the light-scattering detection device 2 of the second embodiment, it is possible to perform the fine adjustment of the aperture width of the aperture plate 260 according to the refractive index information of the solvent in the liquid sample. The magnification M of the imaging optics depends on the refractive index of the solvent. In accordance with the refractive index, by adjusting the aperture width, the scattered light of the same area in the flow path can be received regardless of the solvent. Therefore, a beneficial effect that the molecular weight precision and the particle diameter calculation precision can be well maintained can be exerted.

Third Embodiment

Figure 9:
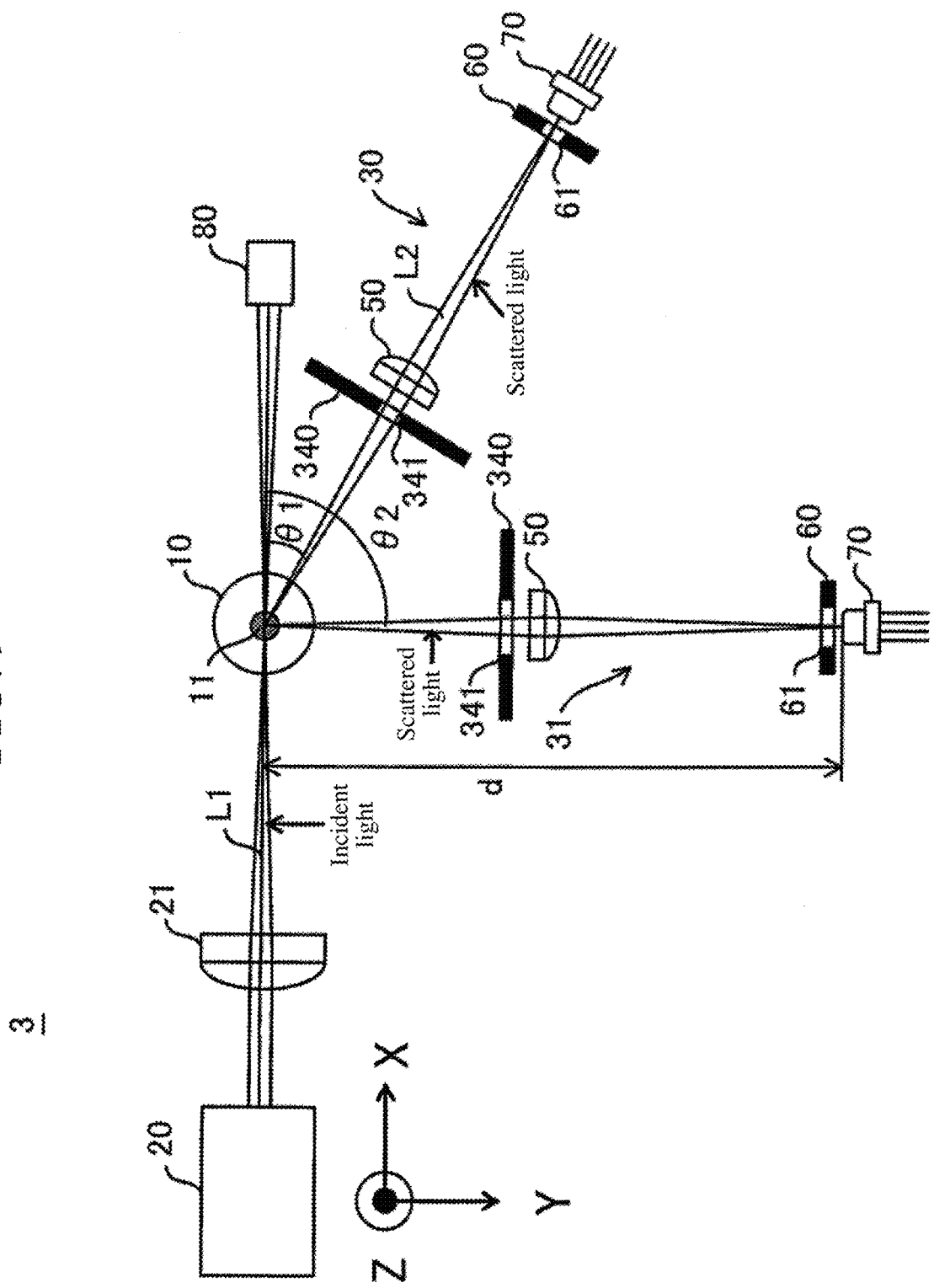
FIG. 9 is a plan view of a light-scattering detection device according to a third embodiment.
Figure 10A:
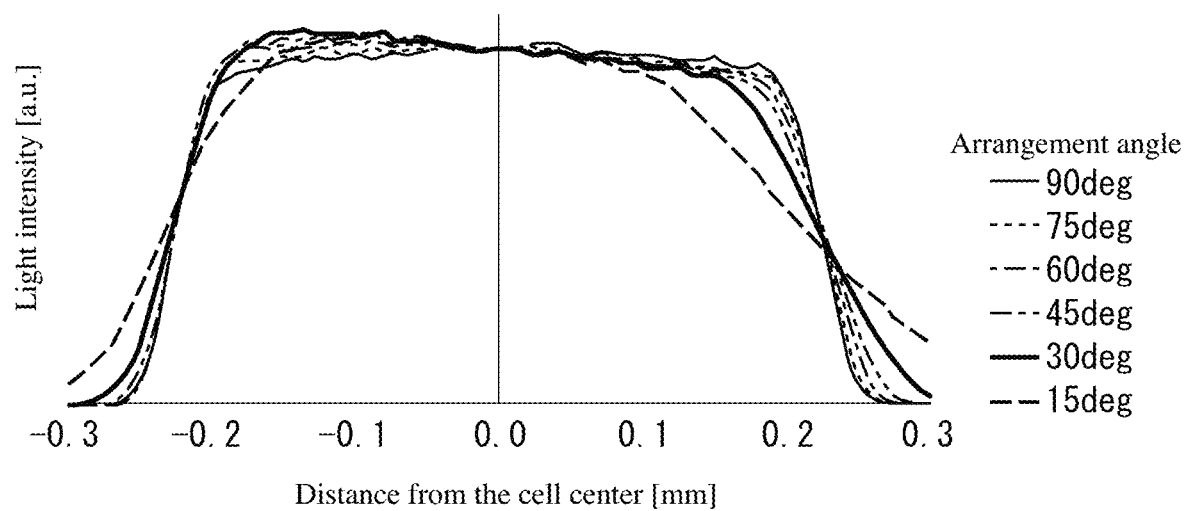
FIG. 10A is an explanatory diagram (a graph showing the relative value of the intensity of the scattered light received by each detector at each arrangement angle) of a chromatographic measurement when the aperture width of the aperture plate is differentiated at the arrangement angle and the slit width of the slit plate is constant regardless of the arrangement angle.
Figure 10B:
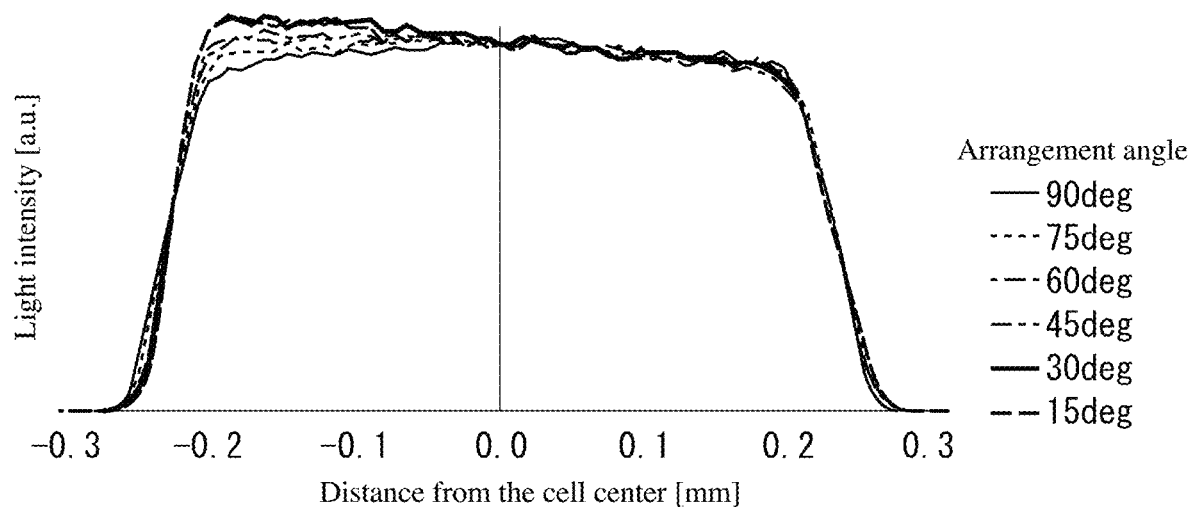
FIG. 10B is an explanatory diagram (a graph showing the relative value of the intensity of the scattered light received by each detector at each arrangement angle) of a chromatographic measurement when the aperture width of the aperture plate is differentiated at the arrangement angle and the slit width of the slit plate is also differed at the arrangement angle.

Next, referring to FIG. 9, FIG. 10A, and FIG. 10B, a light-scattering detection device 3 according to a third embodiment will be described. FIG. 9 is a plan view of the light-scattering detection device according to the third embodiment. FIG. 10A is an explanatory diagram (graph showing the relative value of the intensity of the scattered light received by each detector at each arrangement angle) of a chromatographic measurement when the arrangement angle of the aperture width of the aperture plate is differentiated at the arrangement angle and the slit width of the slit plate is constant regardless of the arrangement angle. FIG. 10B is an explanatory diagram (graph showing the relative value of the intensity of the scattered light received by each detector at each arrangement angle) of a chromatographic measurement when the arrangement angle of the aperture width of the aperture plate is differentiated at the arrangement angle and the slit width of the slit plate is differentiated at the arrangement angle. In this embodiment, the differences from the first embodiment described above will be mainly described, and the descriptions of the same items will be omitted. Note that the same reference numerals as those of the first embodiment have the same or similar configurations. Further, the graphs shown in FIG. 10A and FIG. 10B show the results obtained by calculating the cell position dependency (X dependency) of the intensity relative value of the received scattered light when the intensity of the received scattered light generated at the cell center (X=0) is 1

As shown in FIG. 9, in the light-scattering detection device 3 according to the third embodiment, a plurality of slit plates 340 is arranged around the sample cell 10. The width of each slit 341 of each slit plate 340 becomes maximum when the arrangement angle with respect to the incident direction of the coherent light to the sample cell of 90°, similarly to the aperture width of each aperture plate 60, and the width of each slit 341 decreases as the arrangement angle deviates from the arrangement angle of 90°. Further, in this embodiment, the width of each slit 341 is a value obtained by multiplying the width of the slit 341 when the arrangement angle is 90° by the sine value at of the arrangement angle of each detector 70. For example, when the width of the slit 341 when the arrangement angle is 90° is w0, the width of the slit 341 at the arrangement angle θ1 is set by the width of w0×sin θ1. Further, the width of the slit 341 at the arrangement angle θ2 is set by the width of w0×sin θ2. Thus, in this embodiment, the width of the slit 341 is differentiated according to the arrangement angle θ1, θ2 of each detector 70. Note that the value obtained by multiplying the width of the slit 341 when the arrangement angle is 90° by the sine value of the arrangement angle of each detector 70 includes a value in which a slight correction is added as long as the purpose of the present invention can be achieved, which is also included within the scope of the present invention.

The aperture width of each aperture plate 60 is differentiated by the arrangement angle. However, for the width of each slit 341, in a case where the width is constant regardless of the arrangement angle, i.e., in a case where the width of each slit 341 is not differentiated in accordance with the arrangement angle, the result as shown in the graph shown in FIG. 10A is obtained. As apparent from the graph shown in FIG. 10A, it can be seen that the light intensity at each detector 70 has a tendency that the deviation is likely to occur with respect to the light intensity when the arrangement angle is large as the arrangement angle becomes smaller (e.g., when the arrangement angle is 15 degrees or 30 degrees. Note that when a detector 70 small in the arrangement angle is not used, it is prevented that the deviation affects the detection result of the molecular weight or the rotational radius of the fine particles, such as, e.g., proteins.

Therefore, in order to prevent the deviation of the light intensity in the magnitude of the arrangement angle, as described above, the light-scattering detection device 3 is configured to differentiate the aperture width of each aperture plate 60 and also differentiates the width of each slit 341 in accordance with the arrangement angle. In this case, the result like the graph shown in FIG. 10B is obtained. As is apparent from the graph shown in FIG. 10B, irrespective of the magnitude of the arrangement angle, the graphs of the light intensities corresponding to the respective arrangement angles substantially overlap to each other, so that the above-described deviation is prevented from occurring. With this, the molecular weight and the rotational radius of a fine particle, such as, e.g., a protein, can be detected with high accuracy regardless of the position of the detector 70.

Fourth Embodiment

Figure 11:
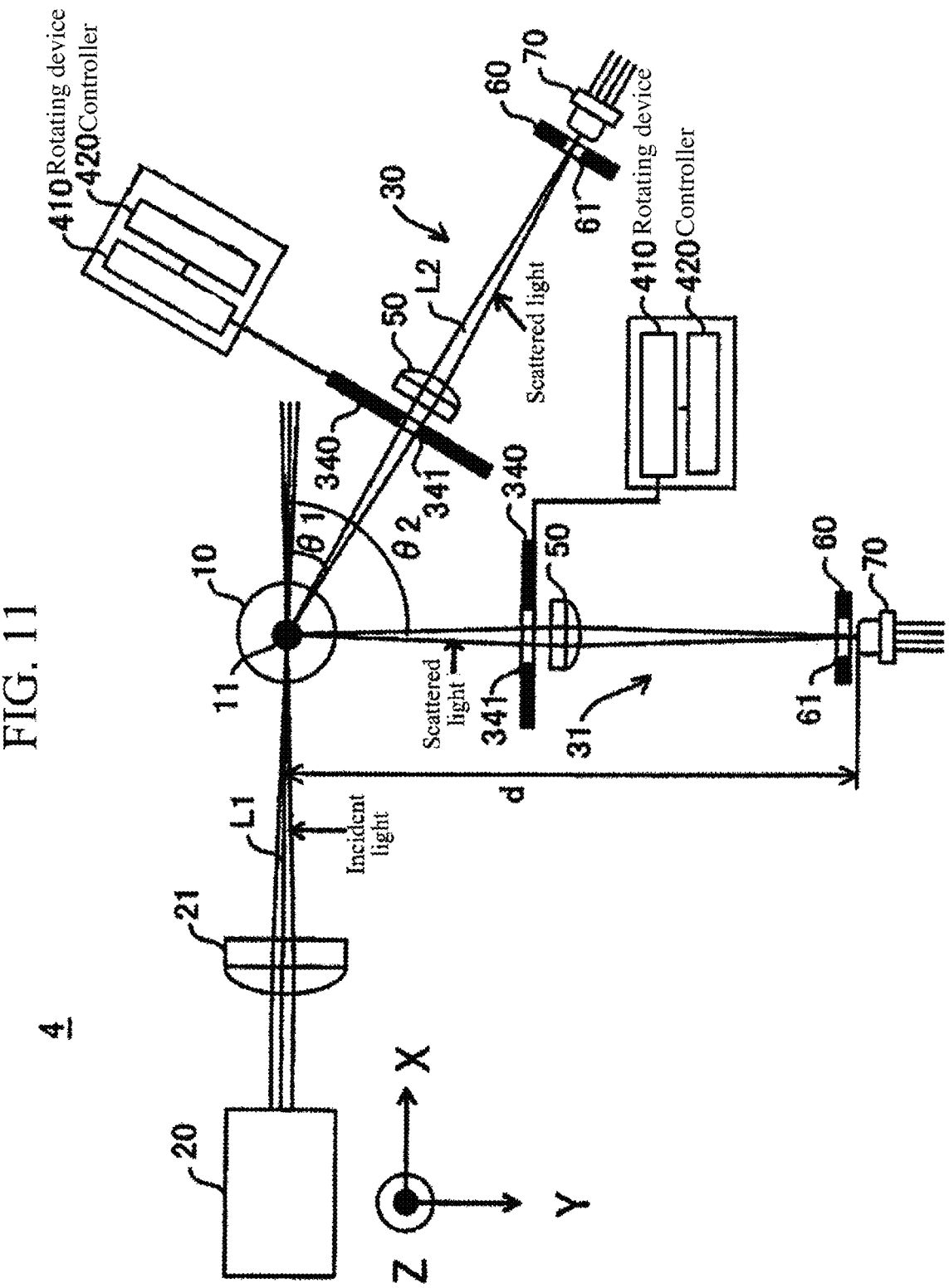
FIG. 11 is a plan view of a light-scattering detection device according to a fourth embodiment.
Figure 12:
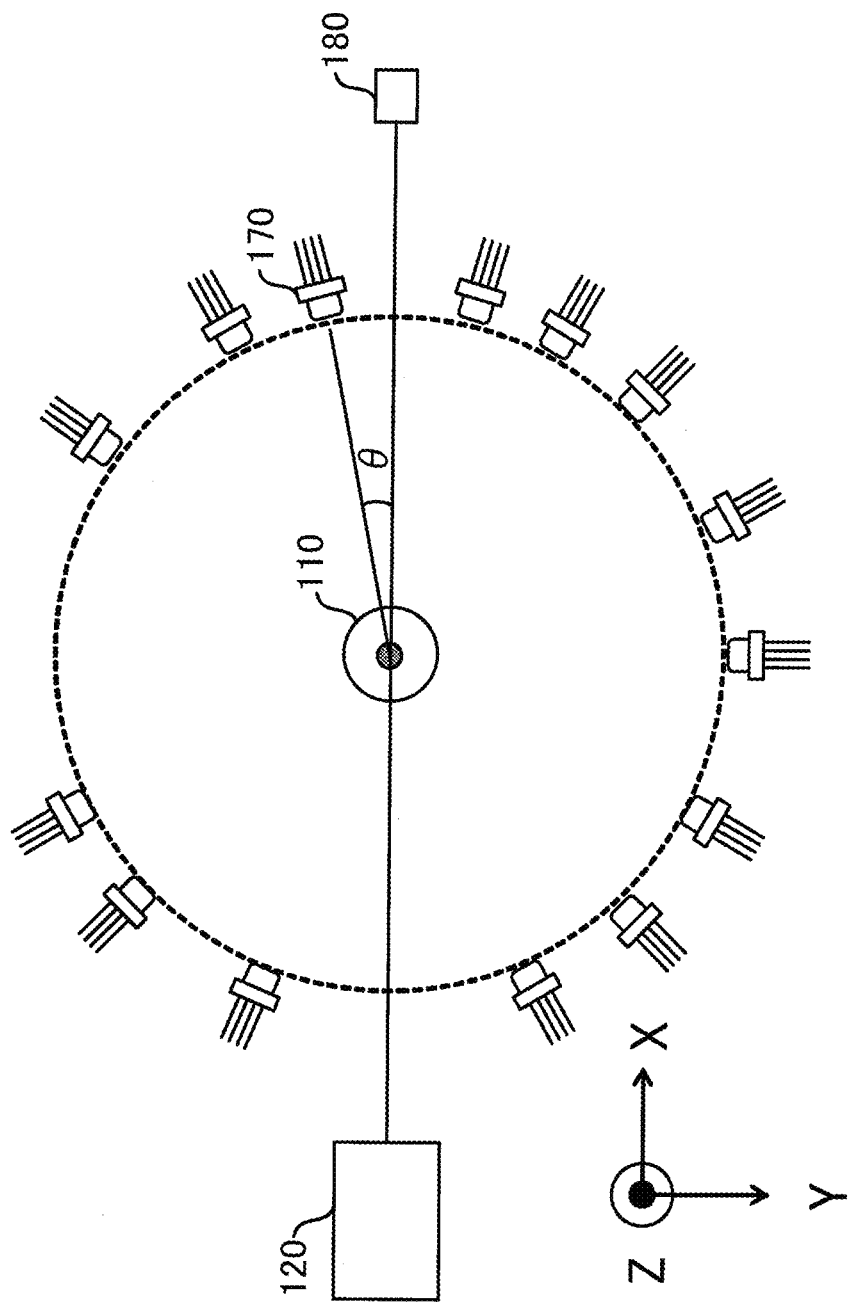
FIG. 12 is a plan view of the basic configuration example of a MALS detecting device.
Figure 13:
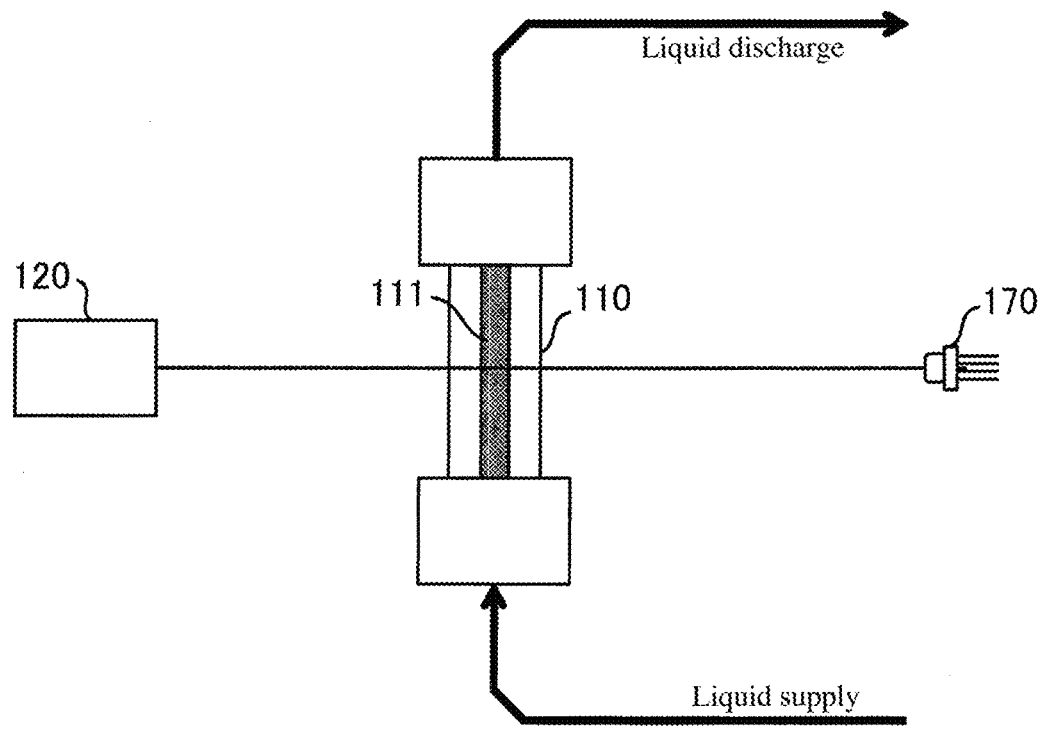
FIG. 13 is a side view of the basic configuration example of a MALS detector.
Figure 14A:
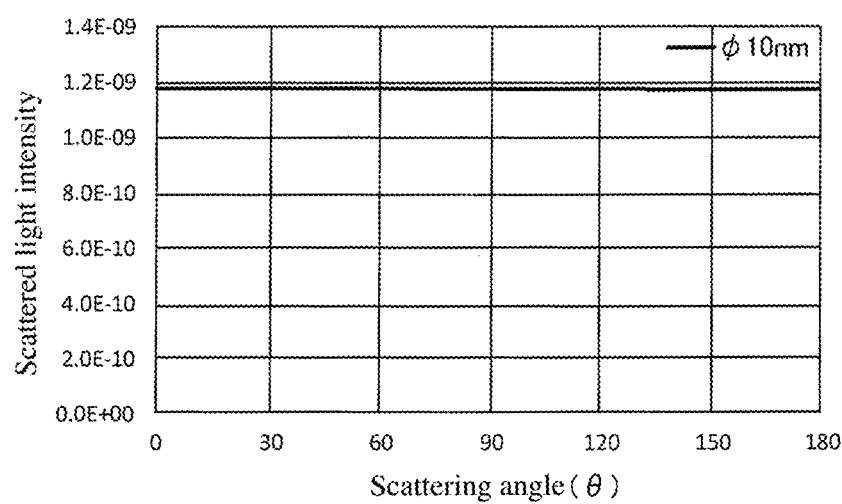
FIG. 14A is an explanatory diagram showing the relation between the intensity and the scattering angle of the scattered light in the case of a particle diameter of 10 nm.
Figure 14B:
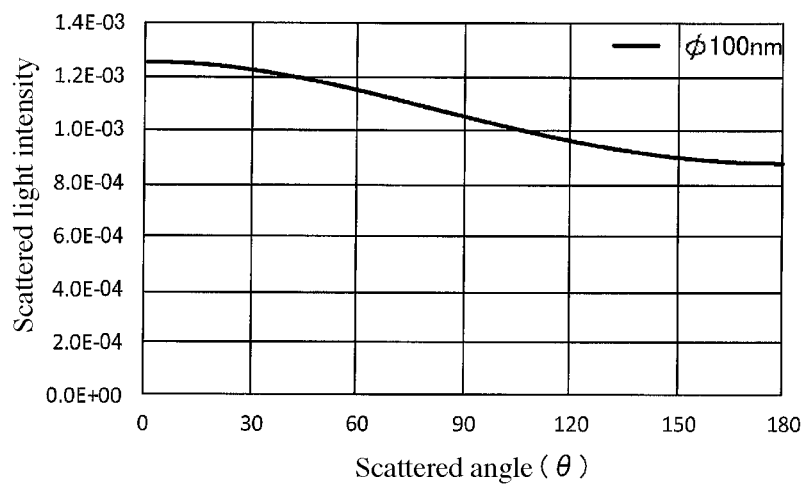
FIG. 14B is an explanatory diagram showing the relation between the intensity and the scattering angle of the scattered light in the case of a particle diameter of 100 nm.
Figure 14C:
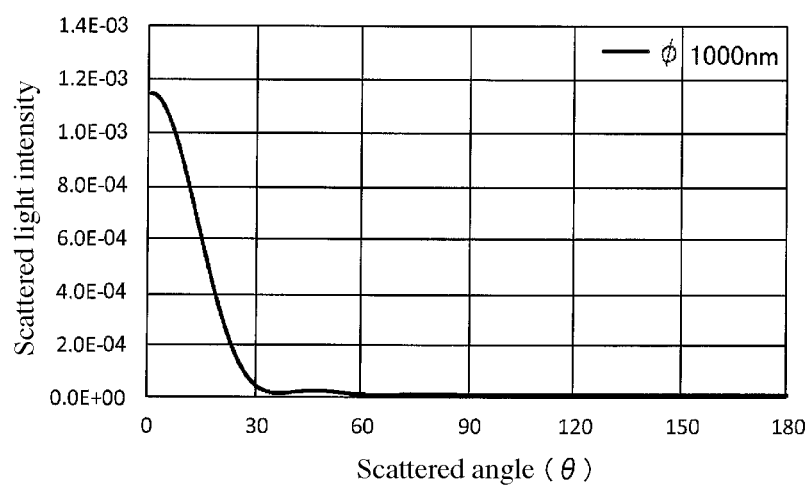
FIG. 14C is an explanatory diagram showing the relation between the intensity and the scattering angle of the scattered light in the case of a particle diameter of 1,000 nm.

Next, referring to FIG. 11, a light-scattering detection device 4 according to a fourth embodiment will be described. FIG. 11 is a plan view of the light-scattering detection device according to the fourth embodiment. The differences from the above-described third embodiment will be mainly described, and the descriptions of the same items will be omitted. In addition, the same reference numerals as those of the third embodiment have the same or similar configurations.

As shown in FIG. 11, the third embodiment differs from the light-scattering detection device 4 according to the fourth embodiment in that the slit plate is arranged rotatably in the horizontal direction in order to perform the fine adjustment of the width of each slit 341. That is, the slit plate 340, for example, is supported by a rotation shaft (not shown) at the center in the vertical direction, and is configured rotatable in the horizontal direction. The slit plate 340 includes a rotating device 410 for rotating the slit plate 340 and a controller 420 for controlling the rotation angle of the slit plate 340.

The pivot shaft is, for example, connected to the rotating device 410, such as, e.g., a stepping motor, by driving the rotary shaft to rotate the slit plate 340. The controller 420 drives the rotating device 410 and controls the rotation angle of the slit plate 340. Then, by using the same slit plate 340 for each slit plate 340 and controlling the rotation angle of each slit plate 340, the attitude of each slit plate 340 is changed. As a result, the width of the slit 341 can be differentiated depending on the arrangement angle. Further, since it is configured to rotate each slit plate 340, it is also possible to perform the fine adjustment of the width of the respective slit 341.

The above embodiment is intended to facilitate comprehension of the present invention and is not intended to limit the present invention. The elements included in embodiments and the arrangements, materials, conditions, shapes, sizes, and the like thereof are not limited to those illustrated, and can be changed as appropriate. Also, the configurations shown in different embodiments may be partially substituted or combined. The light-scattering detection device of the present invention may be a combination of any two or more features of the above-described embodiments.

DESCRIPTION OF SYMBOLS 1, 2, 3, 4: Light-scattering detection device
10: Sample cell
20: Light source
30: Detection optical system
40, 340: Slit plate
41, 341: Slit
50: Imaging optics
60, 260: Aperture plate
61: Opening
70: Detector
210, 410: Rotating device
220, 420: Controller
230: Storage unit

The invention claimed is:

1. A light-scattering detection device for detecting fine particles in a liquid sample, comprising:
a transparent sample cell configured to hold the liquid sample;
a light source configured to emit coherent light to the sample cell;
imaging optics configured to collect light scattered from the sample cell to a periphery thereof at different scattering angles, the imaging optics including a lens;
a slit plate configured to limit a scattering angle range, the slit plate being arranged on an incident side of the imaging optics;
a detector configured to receive collected light from the imaging optics; and
an aperture plate configured to limit a width of light received by the detector by an aperture width, the aperture plate being arranged further toward a detector side than a focal length of the imaging optics,
wherein a plurality of detection optical systems extending from the sample cell to the detector is arranged around the sample cell at equal intervals from a central axis of the sample cell, each of the plurality of detection optical systems having the imaging optics, the slit plate, the detector, and the aperture plate, the plurality of detection optical systems having a plurality of detectors,
wherein the plurality of detectors includes at least three detectors, the at least three detectors including a first detector arranged at a first position closer to a reference position, a third detector arranged at a third position further away from the reference position, and a second detector arranged at a second position between the first detector and the third detector, the second position being closer to the reference position than the third position and further away from the reference position than the first position, the reference position being defined as a position at which an angle with respect to an incident direction of the coherent light to the sample cell is 90°,
wherein the aperture width of the aperture for the first detector is larger than the aperture width of the aperture for the second detector and the aperture width of the aperture for the second detector is larger than the aperture width of the aperture for the third detector, and
wherein the aperture width of each aperture plate is a value obtained by multiplying a distance from the central axis of the sample cell to the detector by a sine value of an arrangement angle of each detector.

2. The light-scattering detection device as recited in claim 1,
wherein the aperture of the aperture plate is straight in at least a side extending along a vertical direction.

3. The light-scattering detection device as recited in claim 1,
wherein the aperture plate is arranged rotatably in a horizontal direction to perform a fine adjustment of the aperture width.

4. The light-scattering detection device as recited in claim 3,
wherein the aperture plate includes a controller for controlling a rotation angle of the aperture plate based on refractive index information of a solvent in the liquid sample.

5. The light-scattering detection device as recited in claim 4,
wherein the aperture plate includes a rotating device for rotating the aperture plate and a storage for storing the refractive index information of the solvent in the liquid sample.

6. The light-scattering detection device as recited in claim 3, wherein the aperture plate is supported by a rotation shaft extending in a vertical direction, and the aperture plate is rotatable in the horizontal direction about the rotation shaft.

7. The light-scattering detection device as recited in claim 1,
wherein each slit plate is formed to have a slit for limiting the scattering angle range, and
wherein a width of each slit becomes maximum at an arrangement angle of 90° with respect to the incident direction of the coherent light to the sample cell and decreases as the arrangement angle deviates from the arrangement angle of 90°.

8. The light-scattering detection device as recited in claim 7,
wherein the width of each slit is a value obtained by multiplying the width of the slit when the arrangement angle is 90° by a sine value of the arrangement angle of each detector.

9. The light-scattering detection device as recited in claim 1,
wherein the light source is arranged such that an optical axis of the coherent light incident on the sample cell from the light source is inclined at a predetermined angle from a plane including the sample cell and the detector.

10. The light-scattering detection device as recited in claim 9, wherein the plane including the sample cell and the detector is a horizontal plane.

* * * * *